US012306518B2

(12) United States Patent
Kim et al.

(10) Patent No.: US 12,306,518 B2
(45) Date of Patent: May 20, 2025

(54) CAMERA DRIVING DEVICE HAVING A PLURALITY OF TIMING BELTS

(71) Applicant: HANWHA TECHWIN CO., LTD., Seongnam-si (KR)

(72) Inventors: Chang Yeon Kim, Seongnam-si (KR); Byeong Ho Lee, Seongnam-si (KR); Hye Jin Yu, Seongnam-si (KR); Byung Moon Jun, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 694 days.

(21) Appl. No.: 17/590,189

(22) Filed: Feb. 1, 2022

(65) Prior Publication Data

US 2023/0077749 A1    Mar. 16, 2023

(30) Foreign Application Priority Data

Sep. 14, 2021    (KR) .......................... 10-2021-0122412

(51) Int. Cl.
G03B 17/56    (2021.01)
(52) U.S. Cl.
CPC ................... G03B 17/561 (2013.01)
(58) Field of Classification Search
CPC ....... G03B 17/561; G03B 17/02; G03B 17/12
See application file for complete search history.

(56) References Cited

U.S. PATENT DOCUMENTS

2005/0113197 A1    5/2005  Pong
2009/0059060 A1*   3/2009  Mukai .................. H04N 23/695
                                                    348/347
2013/0302024 A1   11/2013  Eckert et al.

FOREIGN PATENT DOCUMENTS

| CN | 108111810 A | 6/2018 |
| JP | 2008-78964 A | 4/2008 |
| JP | 2009-58870 A | 3/2009 |
| KR | 10-1596780 B1 | 2/2016 |

OTHER PUBLICATIONS

Communication dated Nov. 14, 2022 issued by the European Patent Office in counterpart European Application No. 22171298.7.

* cited by examiner

*Primary Examiner* — Clayton E. LaBalle
*Assistant Examiner* — Fang-Chi Chang
(74) *Attorney, Agent, or Firm* — Sughrue Mion, PLLC

(57) ABSTRACT

A camera driving device is provided. The camera driving device includes: a motor configured to generate a driving force; an input pulley attached to the motor; a gear assembly including a first gear coupled to the input pulley by a first timing belt, and a second gear formed coaxially with the first gear, the second gear configured to rotate together with the first gear; and an output pulley configured to rotate together with the second gear by a second timing belt, wherein a reduction is made according to a gear transmission ratio between the input pulley and the first gear, a reduction is made according to a gear transmission ratio between the second gear and the output pulley, and a rotation shaft of the output pulley is positioned between a rotation shaft of the input pulley and a rotation shaft of the first gear.

15 Claims, 16 Drawing Sheets

CAMERA DRIVING DEVICE HAVING A PLURALITY OF TIMING BELTS

CROSS-REFERENCE TO THE RELATED APPLICATION

This application claims priority from Korean Patent Application No. 10-2021-0122412, filed on Sep. 14, 2021 in the Korean Intellectual Property Office, and all the benefits accruing therefrom under 35 U.S.C. 119, the entire contents of which are herein incorporated by reference.

BACKGROUND

1. Field

Embodiments of the present disclosure relate to a camera driving device, and more particularly, to a camera driving device in which tensions are automatically adjusted between a plurality of timing belts while providing a high gear ratio by the plurality of timing belts.

2. Description of the Related Art

A surveillance camera supporting pan/tilt/zoom functions may transmit driving power generated from a stepping motor to an output shaft. In order to transmit such a driving power, a timing belt is normally used to couple a motor shaft of the stepping motor and the output shaft.

By using the timing belt as a power transmission structure, a user can easily adjust a gear ratio and an axial distance. However, in terms of the power transmission, there is an important requirement that the tension of the timing belt should be maintained in an optimal state. In case that the tension of the timing belt is too low, there might be concerns about shakings of a camera and slips or malfunctioning of a motor. On the contrary, in a case where the tension of the timing belt is too high, there might be concerns about wear-out or damages of components in the camera assembly and a power reduction of the motor due to a load increase.

In this regard, there might be two schemes to solve the problem. The first scheme is to maintain the tension of the timing belt within a designed range by strict quality controls on dimensions and clearances of the related components. In addition, the second scheme is to adjust the tension of the timing belt by manual controls on the axial distance during the assembling process.

Specifically, in a camera driving device that provides a high gear transmission ratio (reduction ratio) and a large torque compared to a power source using a plurality of timing belts, it is not realistic to rely on accuracy of design and assembling tolerances in order to maintain/adjust tensions acting on the timing belts in an appropriate range. That is, when even one of the plurality of timing belts does not have an appropriate tension, problems of power loss and power transfer accuracy occur.

Furthermore, even though design and assembling are accurately made, when decentering or eccentricity occurs in components due to an influence of an installation angle of a camera assembly or an environment, it will be inevitable that a tension of the timing belt becomes different from a design value.

SUMMARY

Aspects of the present disclosure provide a camera driving device which provides a high gear transmission ratio by a plurality of timing belts and in which tensions acting on the timing belts are automatically adjusted despite data dispersion of related components, without using a separate assembling facility.

Aspects of the present disclosure also provide a camera driving device which provides a high gear transmission ratio by a plurality of timing belts and in which constant tensions act on the timing belts even when decentering of components occurs or after the components are assembled/disassembled.

The assembling of the gear support on the gear tensioner may include assembling a second mover and a second base that constitute the gear tensioner; mounting the gear support on the second mover; and connecting the second mover and the second base to each other by a second elastic member, and the assembling of the motor on the motor tensioner may include assembling a first mover and a first base that constitute the motor tensioner; mounting the motor on the first mover; and connecting the first mover and the first base to each other by a first elastic member.

According to embodiments, a camera driving device is provided. The camera device includes: a motor configured to generate a driving force; an input pulley attached to the motor; a gear assembly including a first gear coupled to the input pulley by a first timing belt, and a second gear formed coaxially with the first gear, the second gear configured to rotate together with the first gear; and an output pulley configured to rotate together with the second gear by a second timing belt, and mounted with a camera module, wherein a first reduction is made according to a gear transmission ratio between the input pulley and the first gear, a second reduction is made according to a gear transmission ratio between the second gear and the output pulley, and a rotation shaft of the output pulley is positioned between a rotation shaft of the input pulley and a rotation shaft of the first gear.

According to one or more embodiments, the camera device further includes a motor tensioner supporting the rotation shaft of the input pulley by elasticity so that the motor is movable; and a gear tensioner supporting the rotation shaft of the first gear and a rotation shaft of the second gear by elasticity so that the gear assembly is movable, wherein a tension of the first timing belt is adjusted by movement of the input pulley and movement of the first gear, and a tension of the second timing belt is adjusted by the movement of the first gear.

According to one or more embodiments, the motor tensioner includes a first base fixed to a camera housing and a first mover that is configured to pivot within a first movable range around a first reference shaft on the first base, and the motor is mounted on the first mover, and the gear tensioner includes a second base fixed to the camera housing, and a second mover that is configured to pivot within a second movable range around a second reference shaft on the second base, and a gear support rotatably supporting the gear assembly is mounted on the second mover.

According to one or more embodiments, the first base includes at least one first slot, the first mover includes at least one first movable shaft accommodated in the at least one first slot so as to be configured to pivot within the first movable range around the first reference shaft, the second base includes at least one second slot, and the second mover includes at least one second movable shaft accommodated in the at least one second slot so as to be configured to pivot within the second movable range around the second reference shaft.

According to one or more embodiments, the first base is in surface contact with the first mover and the second base is in surface contact with the second mover, the first base includes through holes in which at least portions of first fasteners mounting the motor on the first mover are accommodated, in order to avoid interference with the first fasteners, and the second base includes through holes in which at least portions of second fasteners mounting the gear support on the second mover are accommodated, in order to avoid interference with the second fasteners.

According to one or more embodiments, the motor tensioner further includes a first elastic member connected between one side of the first mover and one side of the first base such as to provide a spring force when the first mover pivots on the first base, and the gear tensioner further includes a second elastic member connected between one side of the second mover and one side of the second base such as to provide a spring force when the second mover pivots on the second base.

According to one or more embodiments, the spring force of the second elastic member is greater than the spring force of the first elastic member.

According to one or more embodiments, the second elastic member is a plurality of springs and the first elastic member is a single spring, and wherein the first movable range is greater than the second movable range.

According to one or more embodiments, the output pulley is rotatably supported by a pulley support provided in a camera housing, and includes an extension rod extending from the output pulley and coupled to the camera module, and the extension rod penetrates through an inside of the first timing belt.

According to one or more embodiments, the first timing belt and the second timing belt are disposed in parallel with each other, and the first timing belt is positioned closer than the second timing belt to the camera module.

According to embodiments, a camera driving device is provided. The camera driving device includes: a motor configured to generate a driving force; an input pulley attached to the motor; a motor tensioner supporting a rotation shaft of the input pulley by elasticity so that the motor is movable; a gear assembly including a first gear coupled to the input pulley by a first timing belt, and a second gear formed coaxially with the first gear, the second gear configured to rotate together with the first gear; a gear tensioner supporting a rotation shaft of the first gear and a rotation shaft of the second gear by elasticity so that the gear assembly is movable; and an output pulley configured to rotate together with the second gear by a second timing belt and mounted with a camera module, wherein a first reduction is made according to a gear transmission ratio between the input pulley and the first gear, a second reduction is made according to a gear transmission ratio between the second gear and the output pulley, a tension of the first timing belt is adjusted by movement of the input pulley and movement of the first gear, and a tension of the second timing belt is adjusted by the movement of the first gear.

According to one or more embodiments, the motor tensioner includes a first base fixed to a camera housing, and a first mover configured to pivot within a first movable range around a first reference shaft on the first base, and the motor is mounted on the first mover, and the gear tensioner includes a second base fixed to the camera housing, and a second mover configured to pivot within a second movable range around a second reference shaft on the second base, and a gear support rotatably supporting the gear assembly is mounted on the second mover.

According to one or more embodiments, the first base includes at least one first slot, the first mover includes at least one first movable shaft accommodated in the at least one first slot so as to be configured to pivot within the first movable range around the first reference shaft, the second base includes at least one second slot, and the second mover includes at least one second movable shaft accommodated in the at least one second slot so as to be configured to pivot within the second movable range around the second reference shaft.

According to one or more embodiments, the motor tensioner further includes a first elastic member connected between one side of the first mover and one side of the first base such as to provide a spring force when the first mover pivots on the first base, and the gear tensioner further includes a second elastic member connected between one side of the second mover and one side of the second base such as to provide a spring force when the second mover pivots on the second base.

According to one or more embodiments, the spring force of the second elastic member is greater than the spring force of the first elastic member, the second elastic member is a plurality of springs, and the first elastic member is a single spring.

According to one or more embodiments, the first movable range is greater than the second movable range.

According to one or more embodiments, the output pulley is rotatably supported by a pulley support provided in a camera housing, and includes an extension rod extending from the output pulley and coupled to the camera module, and the extension rod penetrates through an inside of the first timing belt.

According to one or more embodiments, the first timing belt and the second timing belt are disposed in parallel with each other, and the first timing belt is positioned closer than the second timing belt to the camera module.

According to embodiments, a method of assembling a camera driving device is provided. The camera driving device includes: a motor configured to generate a driving force; an input pulley attached to the motor; a motor tensioner supporting a rotation shaft of the input pulley by elasticity so that the motor is movable; a gear assembly including a first gear coupled to the input pulley by a first timing belt and a second gear formed coaxially with the first gear and configured to rotate together with the first gear; a gear tensioner supporting a rotation shaft of the first gear and a rotation shaft of the second gear by elasticity so that the gear assembly is movable; and an output pulley configured to rotate together with the second gear by a second timing belt and mounted with a camera module. The method includes: installing the output pulley on a pulley support in a camera housing; assembling a gear support on the gear tensioner, the gear support rotatably supporting the gear assembly; coupling the output pulley and the second gear to each other by the second timing belt; assembling the motor on the motor tensioner; and coupling the input pulley, attached to the motor, and the first gear to each other by the first timing belt.

According to one or more embodiments, the assembling the gear support on the gear tensioner includes: assembling a second mover and a second base that constitute the gear tensioner; mounting the gear support on the second mover; and connecting the second mover and the second base to each other by a second elastic member. The assembling the motor on the motor tensioner includes: assembling a first mover and a first base that constitute the motor tensioner;

mounting the motor on the first mover; and connecting the first mover and the first base to each other by a first elastic member.

With the camera driving device according to an embodiment of the present disclosure, tensions acting on timing belts may be automatically adjusted without using a separate assembling facility despite data dispersion of related components, and constant tensions may be maintained in the respective timing belts even when decentering of components occurs or after the components are assembled/disassembled.

In addition, with the camera driving device according to an embodiment of the present disclosure, appropriate tensions may be provided to respective timing belts irrespective of the assembling order of a plurality of timing belts.

BRIEF DESCRIPTION OF THE DRAWINGS

The above and other aspects and features of the present disclosure will become more apparent by describing in detail non-limiting example embodiments thereof with reference to the attached drawings, in which.

DETAILED DESCRIPTION

Figure 1:
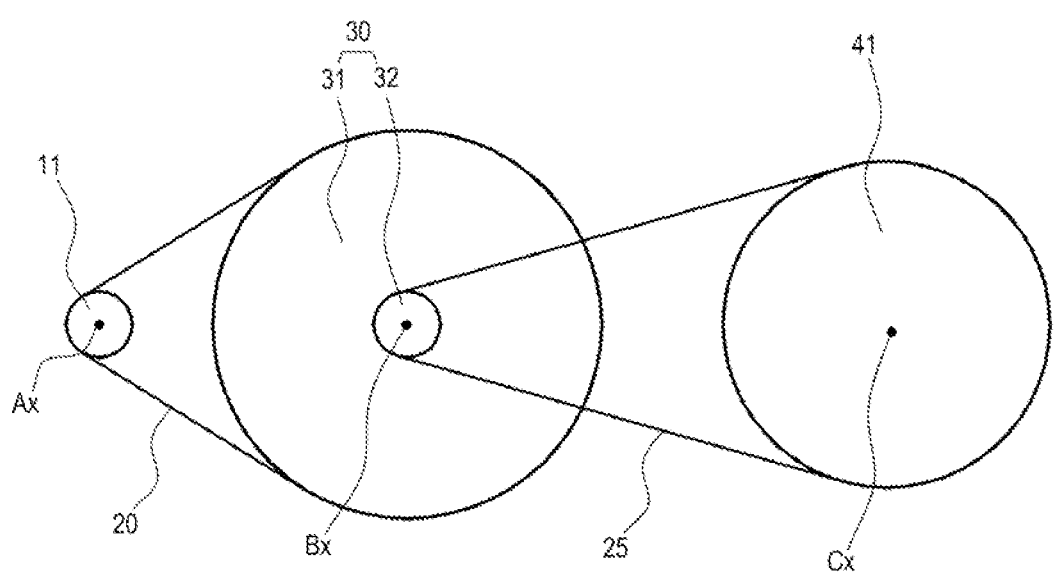
FIG. 1 is a conceptual diagram of a multi-belt structure used in a camera driving device according to the present disclosure.

Advantages and features of embodiments of the disclosure and methods to achieve them will become apparent from the below descriptions of non-limiting example embodiments with reference to the accompanying drawings. However, embodiments of the disclosure are not limited to the embodiments described below and may be implemented in various ways. The non-limiting example embodiments are provided for making the disclosure thorough and for fully conveying the scope of the disclosure to those skilled in the art. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, non-limiting example embodiments of the present disclosure will be described in detail with reference to the accompanying drawings.

In general, there is a limit in increasing a gear transmission ratio or a reduction ratio using a single timing belt in a camera driving device. First, in order to increase the gear transmission ratio, a gear size may be increased, and accordingly, a size of a required internal space is increased in proportion to the gear size. Second, a contact area of the timing belt connected to a motor shaft is decreased due to such an increase in the gear transmission ratio, such that power transmission force is decreased. Third, in order to solve these problems, an inter-shaft distance may be increased, which causes an additional size problem. Fourth, motor power loss is increased due to an increase in a moment of inertia caused by the increase in the gear size.

In order to provide a high gear transmission ratio while solving these problems, a camera driving device according to an embodiment of the present disclosure utilizes a multi-belt structure. FIG. 1 is a conceptual diagram of a multi-belt structure used in a camera driving device according to the present disclosure.

According to such a multi-belt structure, there may be a total of three rotation shafts. An input pulley 11 connected to an output shaft of a motor forms a first rotation shaft Ax, a gear assembly 30 including a first gear 31 and a second gear 32 forms a second rotation shaft Bx, and finally, an output pulley 41 connected to a camera module forms a third rotation shaft Cx.

When the input pulley 11 rotates by power generated from the motor, a torque of the input pulley 11 is transmitted to the first gear 31 through the first timing belt 20. In this case, the second gear 32 is coaxial with the first gear 31, and rotates integrally with the first gear 31 so as to have the same revolutions per minute (RPM) as the first gear 31. A torque of the second gear 32 is finally transmitted to the output pulley 41 through a second timing belt 25. In this case, a torque of the output pulley 41 follows Equations 1 and 2 below.

Torque of Output Pulley=Torque of Motor×Total Gear Transmission Ratio  [Equation 1]

Total Gear Transmission Ratio=Gear Transmission
Ratio 1×Gear Transmission Ratio 2  [Equation 2]

Here, Gear Transmission Ratio 1 is a gear transmission ratio between the input pulley 11 and the first gear 31 coupled to each other by the first timing belt 20, and Gear Transmission Ratio 2 is a gear transmission ratio between the second gear 32 and the output pulley 41 coupled to each other by the second timing belt 25. Accordingly, a first reduction is made according to the gear transmission ratio between the input pulley 11 and the first gear 31 (Gear Transmission Ratio 1), and a second reduction is made according to the gear transmission ratio between the second gear 32 and the output pulley 41 (Gear Transmission Ratio 2). Due to such a high total gear transmission ratio or reduction ratio, it is possible to provide a large output with a small power of the motor.

Figure 2:
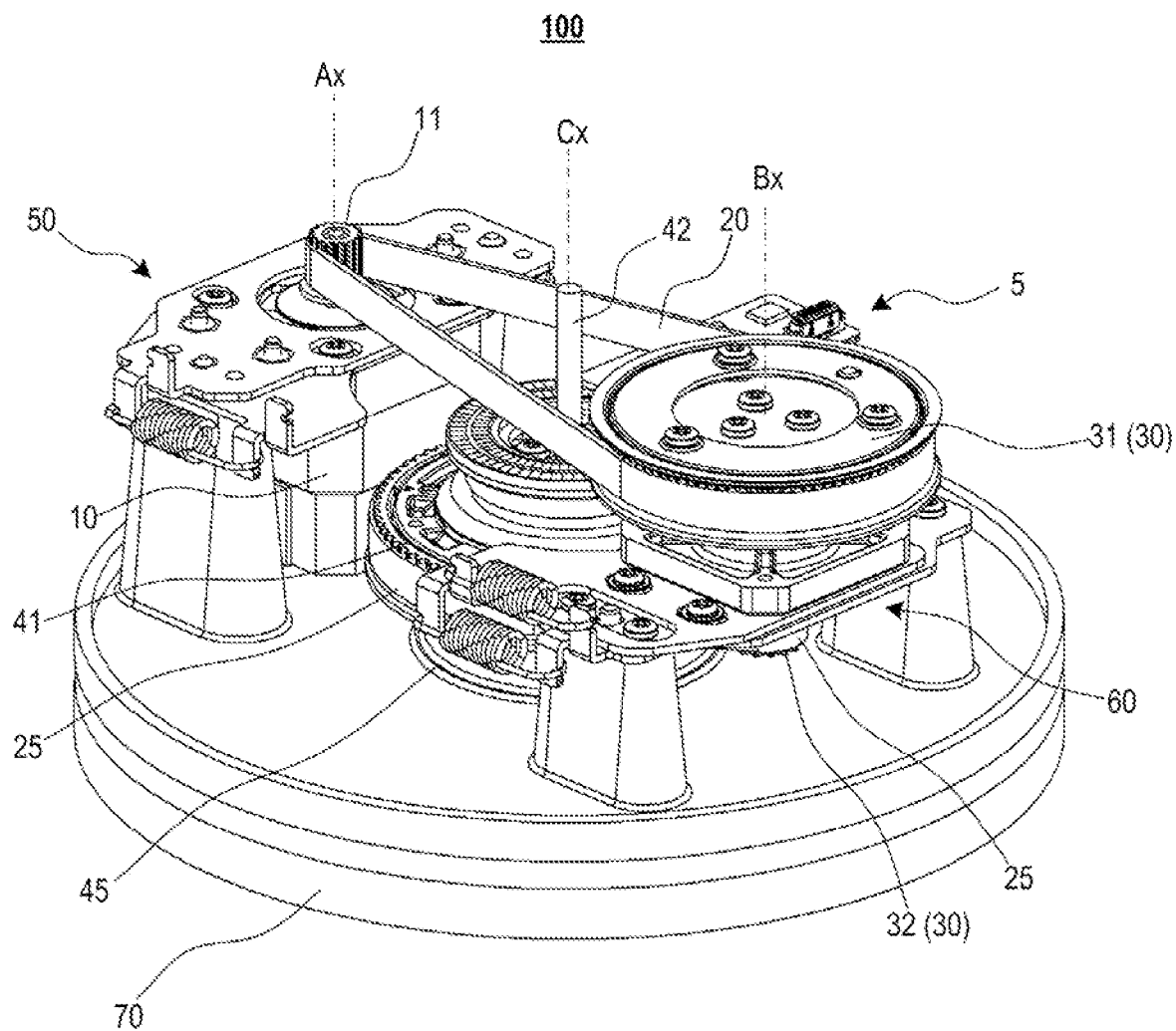
FIG. 2 is a perspective view illustrating a camera driving device according to an example embodiment of the present disclosure.
Figure 3:
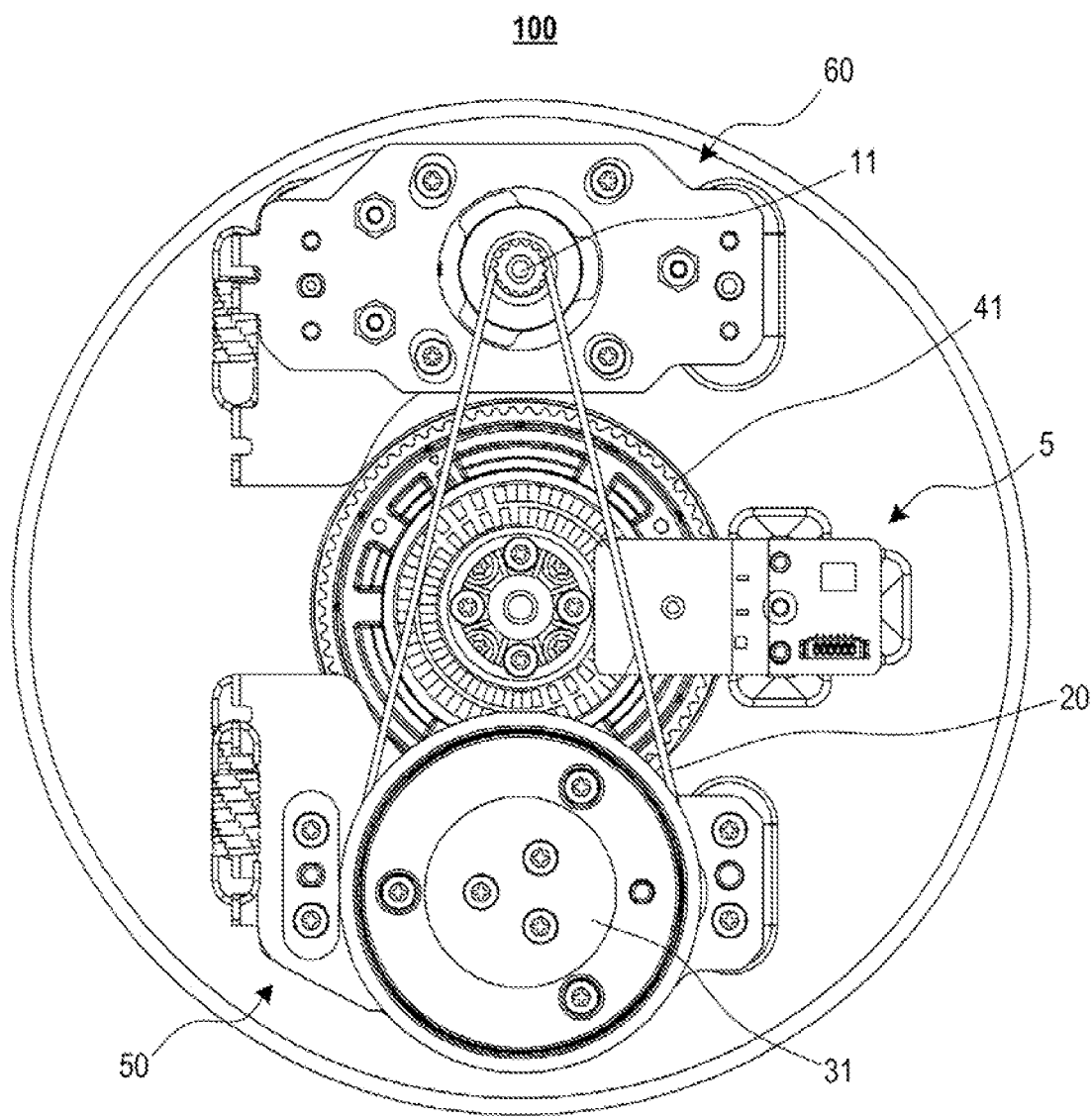
FIG. 3 is a plan view illustrating the camera driving device of FIG. 2.

FIG. 2 is a perspective view illustrating a camera driving device 100 according to an example embodiment of the present disclosure, and FIG. 3 is a plan view illustrating the camera driving device 100 of FIG. 2. Hereinafter, for convenience of explanation, a cover and a camera module are not illustrated.

The camera driving device 100 may generally include a motor 10 generating a driving force; an input pulley 11 formed in the motor; a gear assembly 30 including a first gear 31 coupled to the input pulley 11 by a first timing belt 20 and a second gear 32 formed coaxially with the first gear 31 and rotating together with the first gear 31; and an output pulley 41 rotating together with the second gear 32 by a second timing belt 25 and mounted with a camera module (not illustrated). In this case, a first reduction is made according to a gear transmission ratio between the input pulley 11 and the first gear 31, and a second reduction is made according to a gear transmission ratio between the second gear 32 and the output pulley 41.

In addition, unlike the conceptual diagram in FIG. 1, a third rotation shaft Cx of the output pulley 41 is positioned between a first rotation shaft Ax of the input pulley 11 and a second rotation shaft Bx of the first gear 31. Through such a disposition, a more compact configuration of components of the camera driving device together with a decrease in an overall length of the camera driving device is enabled.

Referring to FIG. 2 again, the output pulley 41 is rotatably supported by a pulley support 45 provided in a camera housing 70, and includes an extension rod 42 extending from the output pulley 41 and coupled to the camera module. The extension rod 42 may be disposed to penetrate through the inside of the first timing belt 20 for space efficiency of the camera driving device 100.

In addition, the first timing belt 20 and the second timing belt 25 are disposed in parallel with each other on the upper side and the lower side, respectively, in the camera housing 70, and the first timing belt 20 is positioned on the side closer to the camera module than the second timing belt 25 is, that is, the upper side of the camera housing 70.

In addition, the camera driving device 100 may further include a motor tensioner 50 and a gear tensioner 60. The motor tensioner 50 supports the rotation shaft of the input pulley 11 by elasticity so that the motor 10 is movable, and the gear tensioner 60 supports the rotation shaft of the first gear 31 and a rotation shaft of the second gear 32 by elasticity so that the gear assembly 30 is movable. According to the camera driving device 100 including the motor tensioner 50 and the gear tensioner 60, a tension of the first timing belt 20 is adjusted by the movement of the input pulley 11 and the first gear 31, and a tension of the second timing belt 25 is adjusted by the movement of the first gear 31.

Detailed configurations and functions of such a motor tensioner 50 and gear tensioner 60 will be described later in more detail with reference to the following drawings.

Meanwhile, in order to detect a rotation amount or a rotation speed of the output pulley 41 for posture control and measurement of the camera module, the camera driving device 100 may further include a rotation detection sensor 5 for detecting the rotation amount or the rotation speed of the output pulley 41. For example, N poles and S poles of a plurality of magnets may be alternately disposed in the output pulley 41, and the rotation detection sensor 5 may detect the rotation amount of the output pulley 41 by counting the number of N poles or S poles detected according to the rotation of the output pulley 41.

Figure 4:
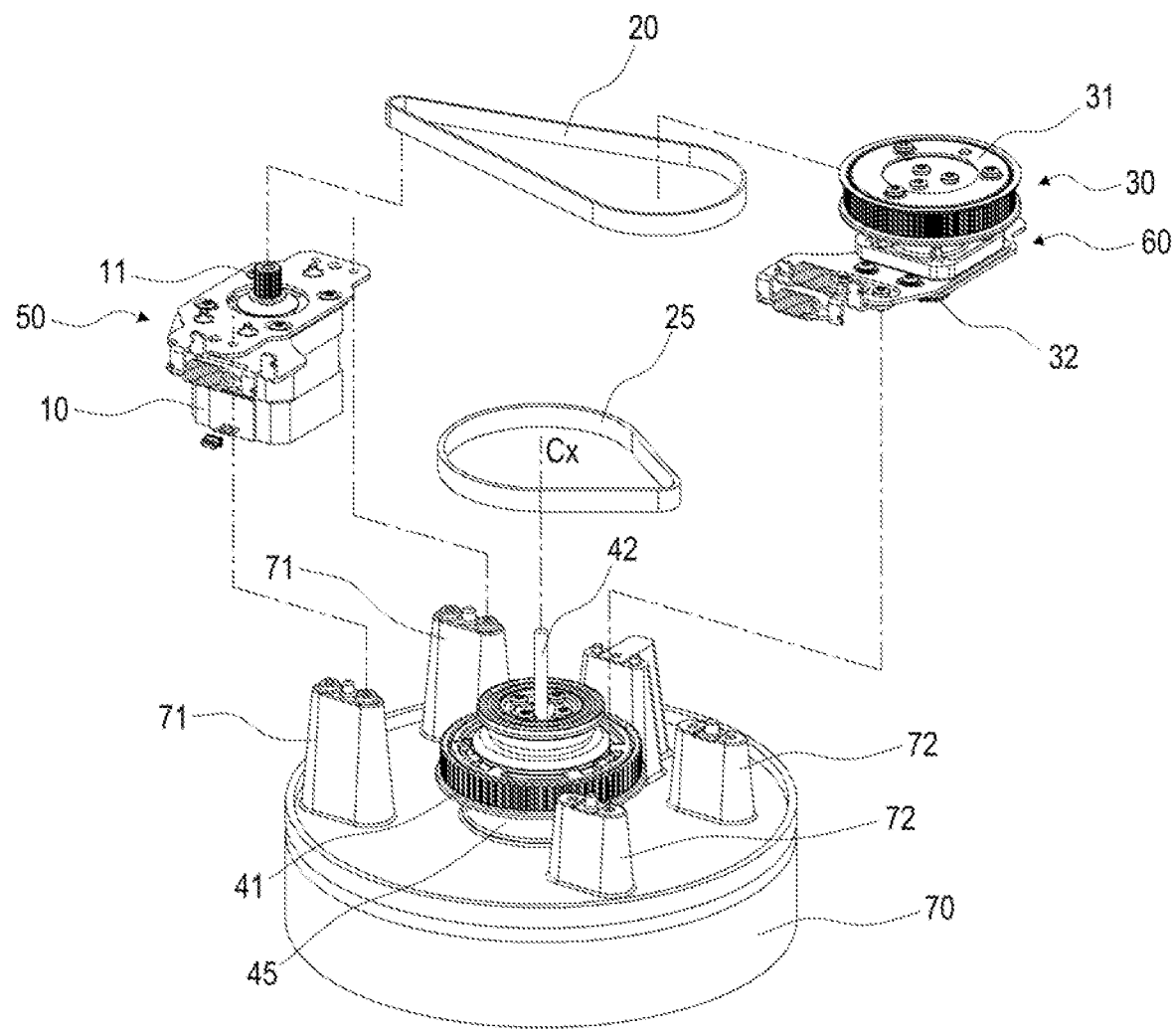
FIG. 4 is an exploded perspective view illustrating a structure in which a motor tensioner and a gear tensioner are mounted on a camera housing.

FIG. 4 is an exploded perspective view illustrating a structure in which the motor tensioner 50 and the gear tensioner 60 are mounted on the camera housing 70. The output pulley 41 is rotatably supported by the pulley support 45 provided in the camera housing 70. In addition, the motor tensioner 50 may be fixedly mounted on first mounts 71 formed in the camera housing 70 through fasteners, and similarly, the gear tensioner 60 may be fixedly mounted on second mounts 72 formed in the camera housing 70 through fasteners.

Figure 5:
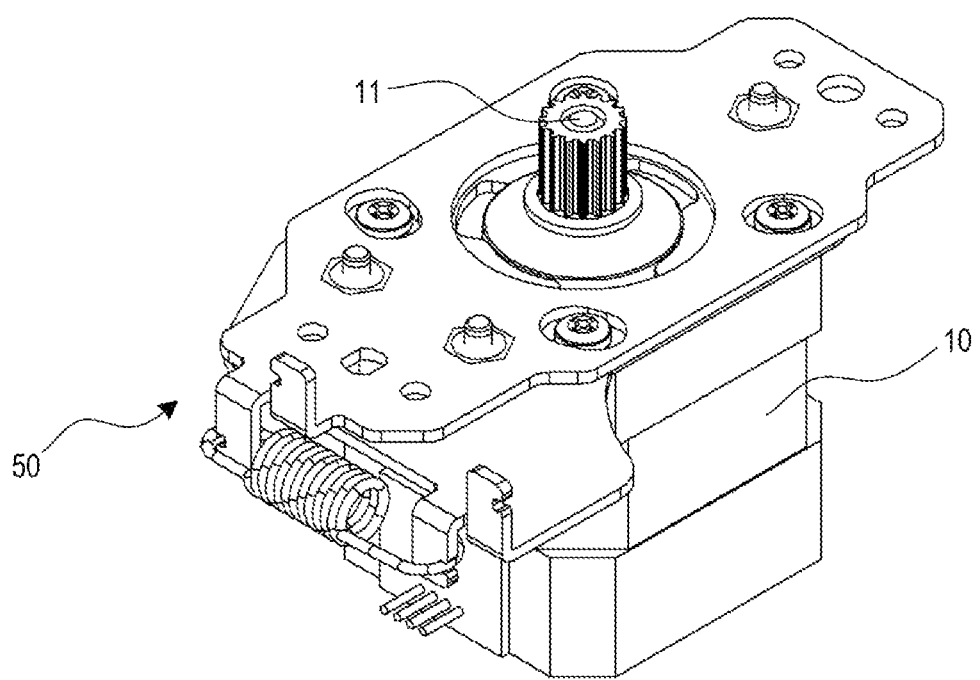
FIG. 5 is a perspective view illustrating a structure in which the motor tensioner and a motor are assembled.
Figure 6:
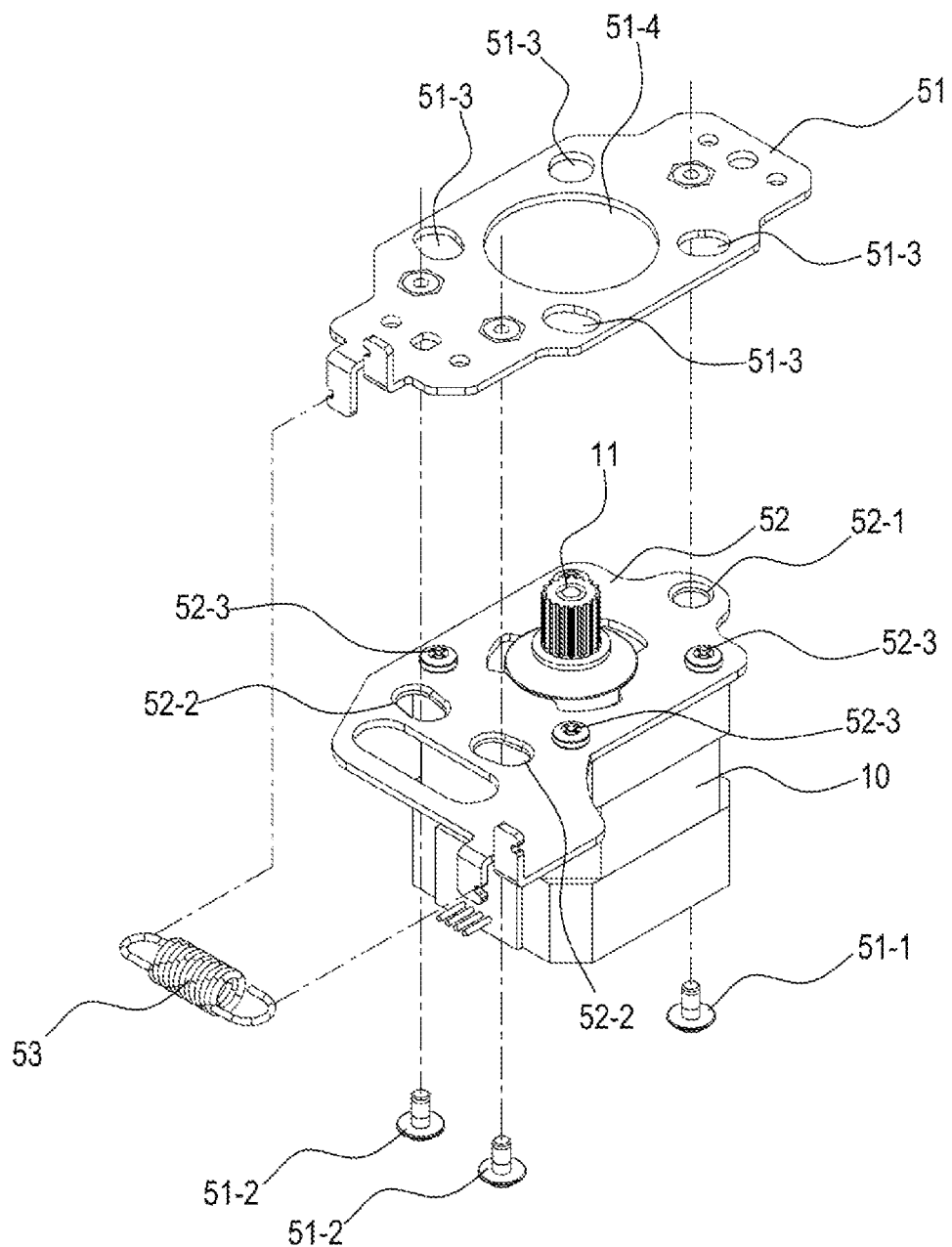
FIG. 6 is an exploded perspective view of the structure of FIG. 5.

FIG. 5 is a perspective view illustrating a structure in which the motor tensioner 50 and the motor 10 are assembled, and FIG. 6 is an exploded perspective view of the structure of FIG. 5.

The motor tensioner 50 includes a first base 51 fixed to the camera housing 70 and a first mover 52 pivoting within a first movable range around a first reference shaft 51-1 on the first base 51. In this case, the motor 10 is mounted on the first mover 52.

The first base 51 includes a plurality of first slots 52-2, and the first mover 52 includes a plurality of first movable shafts 51-2 accommodated, respectively, in the first slots 52-2 so as to pivot within the first movable range around the first reference shaft 51-1.

Here, the first base 51 and the first mover 52 are in surface contact with each other, and the first base 51 includes through holes 51-3 in which at least portions of fasteners 52-3 mounting the motor 10 on the first mover 52 are accommodated, in order to avoid interference with the fasteners 52-3. In addition, the first base 51 includes a central opening 51-4 so that the input pulley 11 coupled to the first timing belt 20 may be exposed to the upper side.

Meanwhile, the motor tensioner 50 may further include a first elastic member 53 connected between one side of the first mover 52 and one side of the first base 51 in order to provide a spring force (resilient bias) or a restoring force when the first mover 52 pivots on the first base 51. Such a first elastic member 53 may be implemented in the form of a coil spring.

Figure 7A:
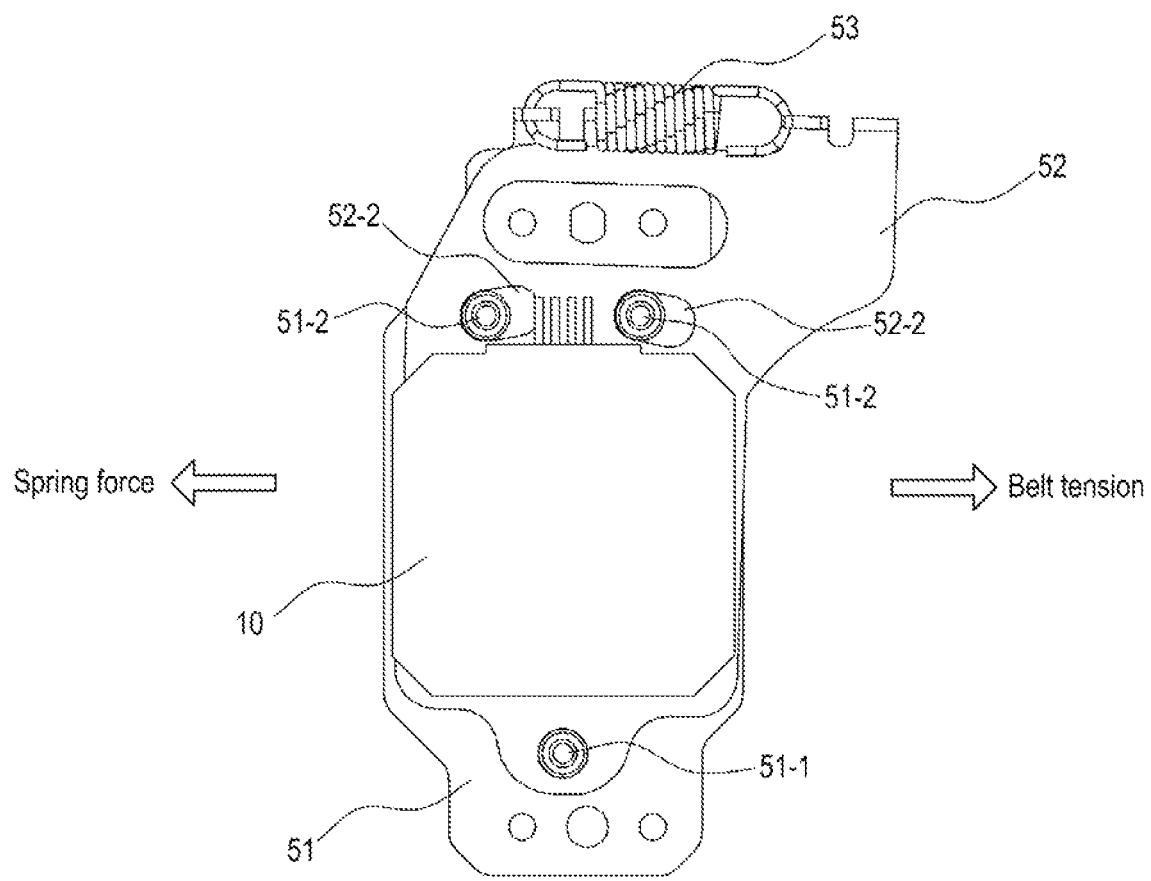
FIG. 7A is a view illustrating a first position to which the motor may move on the motor tensioner.
Figure 7B:
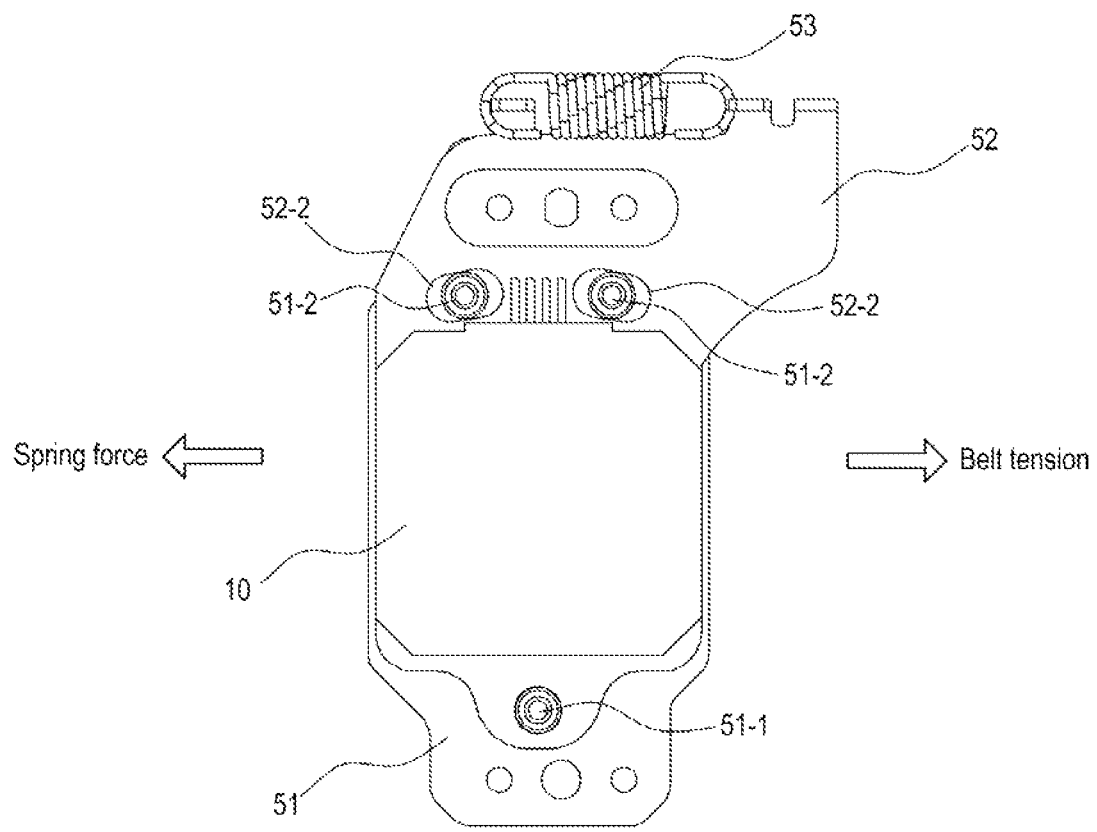
FIG. 7B is a view illustrating a second position to which the motor may move on the motor tensioner.
Figure 7C:
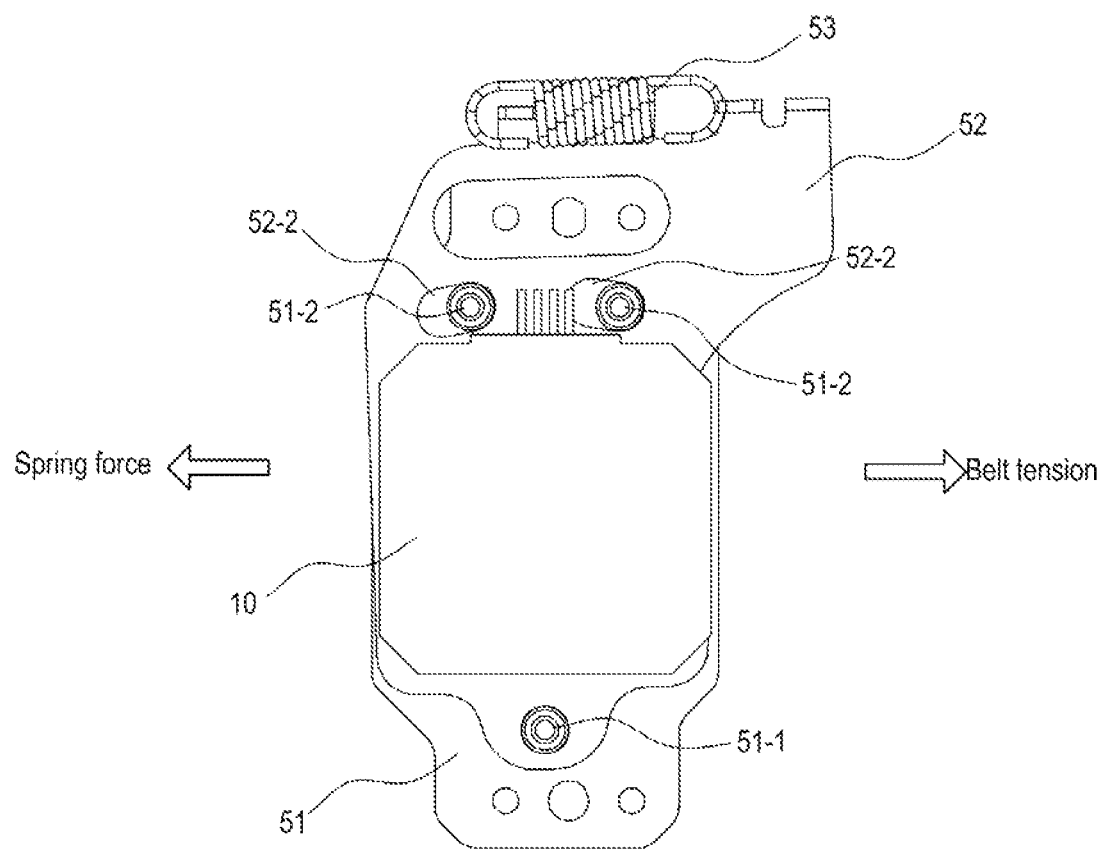
FIG. 7C is a view illustrating a third position to which the motor may move on the motor tensioner.

FIGS. 7A to 7C are views illustrating various positions to which the motor 10 may move on the motor tensioner 50. Among FIGS. 7A to 7C, FIG. 7A illustrates a state in which the first mover 52 moves the most to the right in a movable range (first movable range) because a belt tension is greater than a spring force of the first elastic member 53. In addition, FIG. 7C illustrates a state in which the first mover 52 moves the most to the left in the movable range because the belt tension is smaller than the spring force. In addition, FIG. 7B illustrates a state in which the first mover 52 is positioned at an intermediate point in the movable range because the belt tension and the spring force are balanced.

In this manner, while the force generated by the first elastic member 53 mounted between the first base 51 and the first mover 52 and the tension of the first timing belt 20 are balanced, an appropriate tension may be maintained in the first timing belt 20. When the tension of the first timing belt 20 increases or decreases for any reason, the motor 10 moves close to or away from the gear assembly 30 by the first mover 52. That is, an inter-shaft distance between the rotation shaft Ax of the input pulley 11 and the rotation shaft Bx of the gear assembly 30 is adaptively adjusted, such that the tension of the first timing belt 20 is maintained within an appropriate range.

Figure 8:
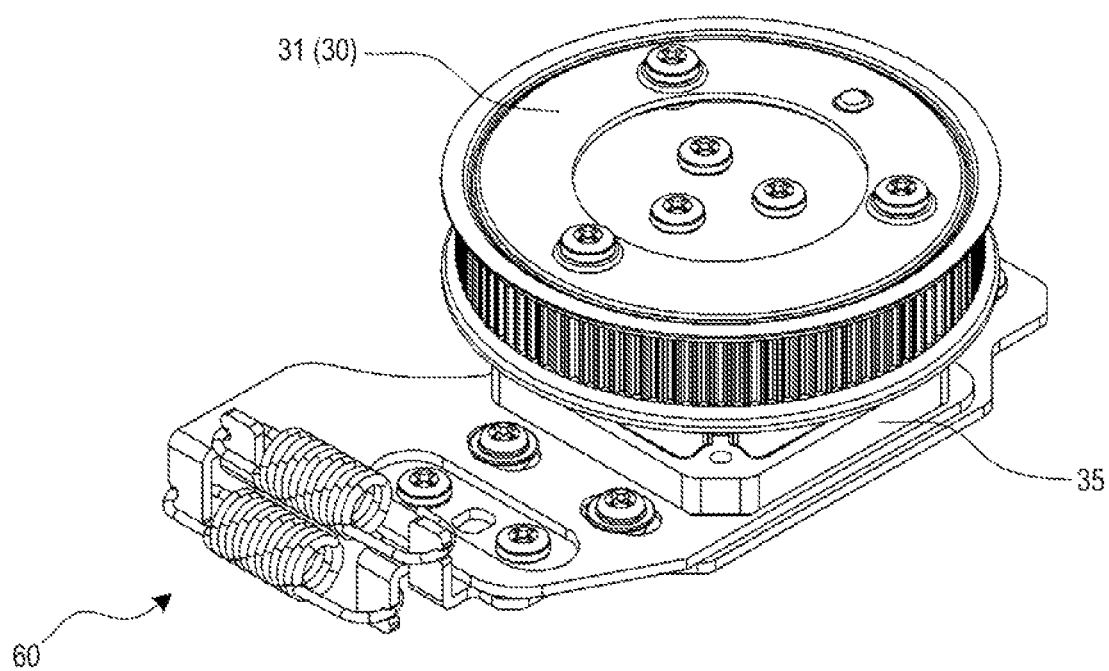
FIG. 8 is a perspective view illustrating a structure in which the gear tensioner and a gear assembly are assembled.
Figure 9:
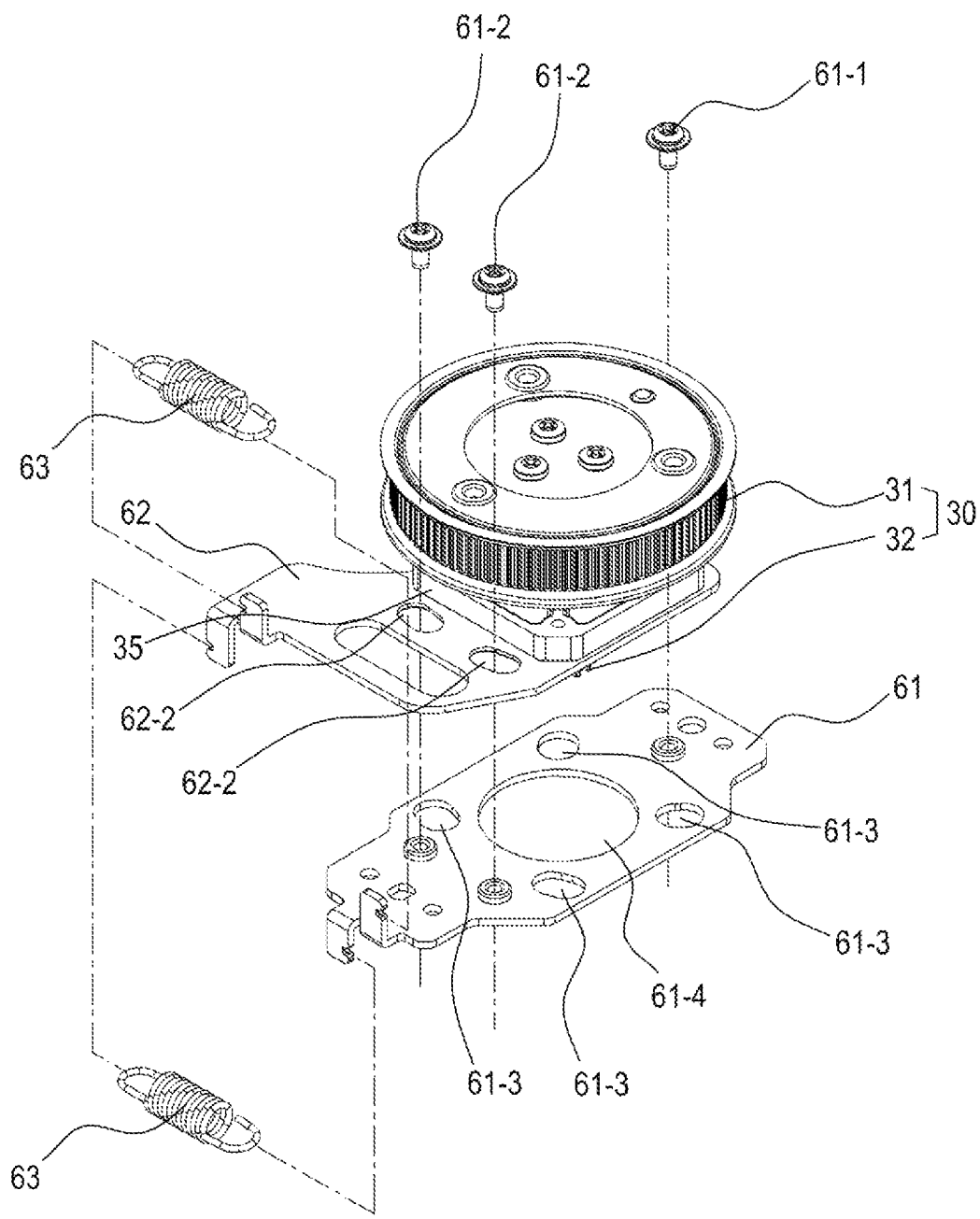
FIG. 9 is an exploded perspective view of the structure of FIG. 8.

FIG. 8 is a perspective view illustrating a structure in which the gear tensioner 60 and the gear assembly 30 are assembled, and FIG. 9 is an exploded perspective view of the structure of FIG. 8.

The gear tensioner 60 includes a second base 61 fixed to the camera housing 70 and a second mover 62 pivoting within a second movable range around a second reference shaft 61-1 on the second base 61. In this case, a gear support 35 rotatably supporting the gear assembly 30 is mounted on the second mover 62.

The second mover 62 includes at least one second slot 62-2, and the second base 61 includes at least one second movable shaft 61-2 accommodated in the at least one second slot 62-2 so as to pivot within the second movable range around the second reference shaft 61-1.

Here, the second base 61 and the second mover 62 are in surface contact with each other, and the second base 61 includes through holes 61-3 in which at least portions of fasteners 62-3 mounting the gear support 35 on the second mover 62 are accommodated, in order to avoid interference with the fasteners 62-3. In addition, the second base 61 includes a central opening 61-4 so that the second gear 32 coupled to the second timing belt 25 may be exposed to the lower side.

Meanwhile, the gear tensioner 60 may further include a second elastic member 63 connected between one side of the second mover 62 and one side of the second base 61 in order to provide a spring force (resilient bias) or a restoring force when the second mover 62 pivots on the second base 61. Such a second elastic member 63 may be implemented in the form of a coil spring(s).

Figure 10A:
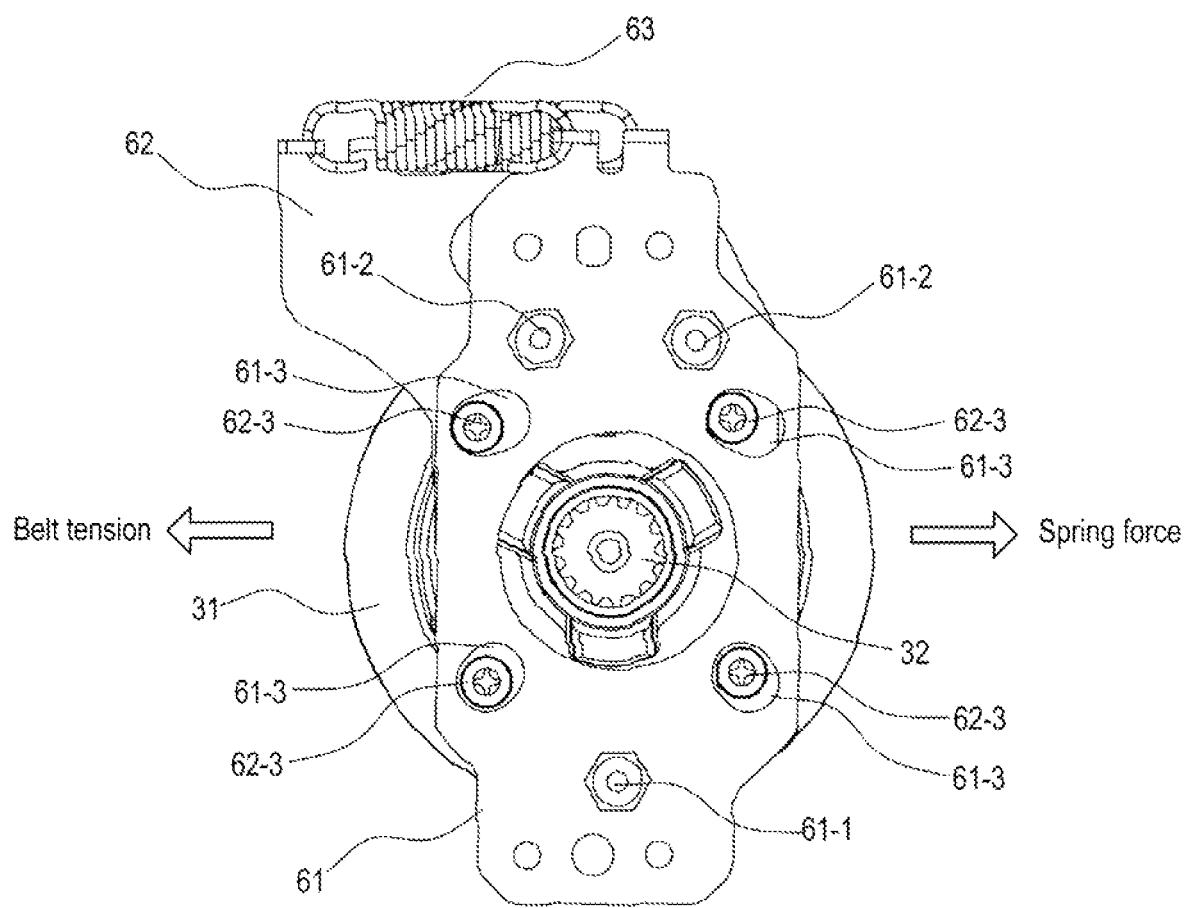
FIG. 10A is a view illustrating a first position to which the gear assembly may move on the gear tensioner
Figure 10B:
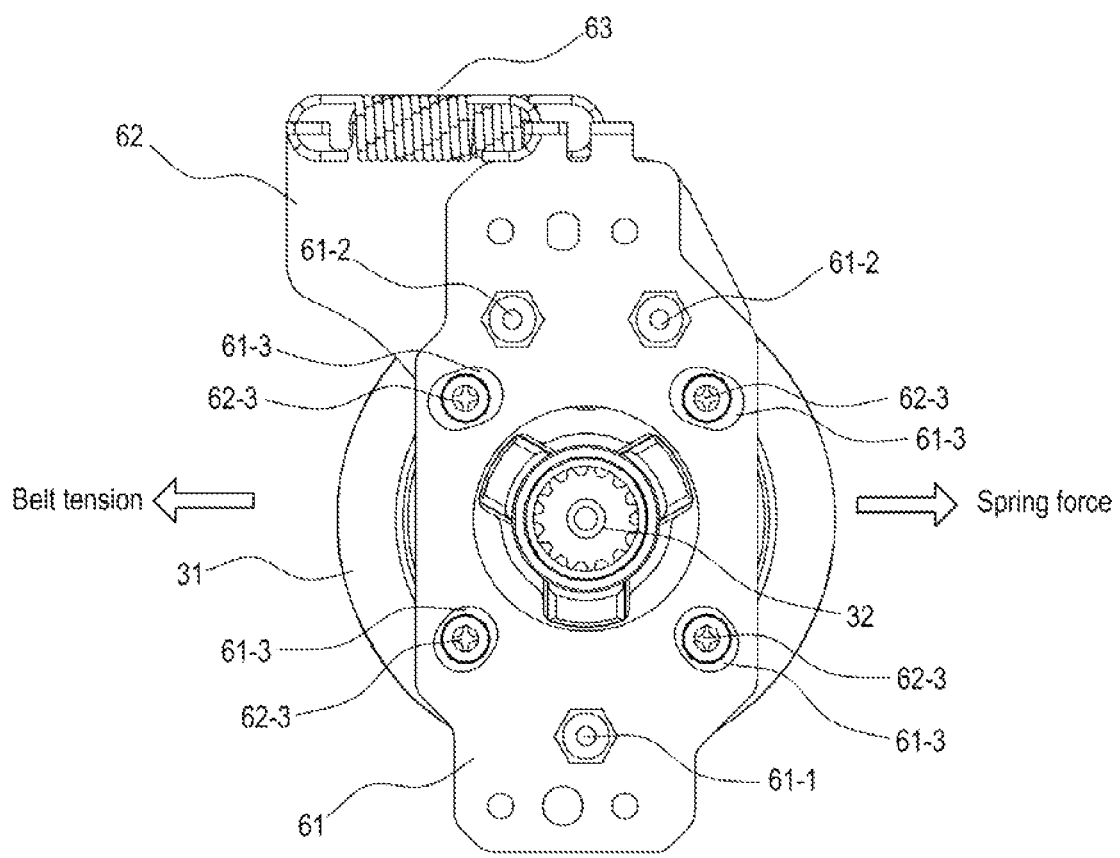
FIG. 10B is a view illustrating a second position to which the gear assembly may move on the gear tensioner
Figure 10C:
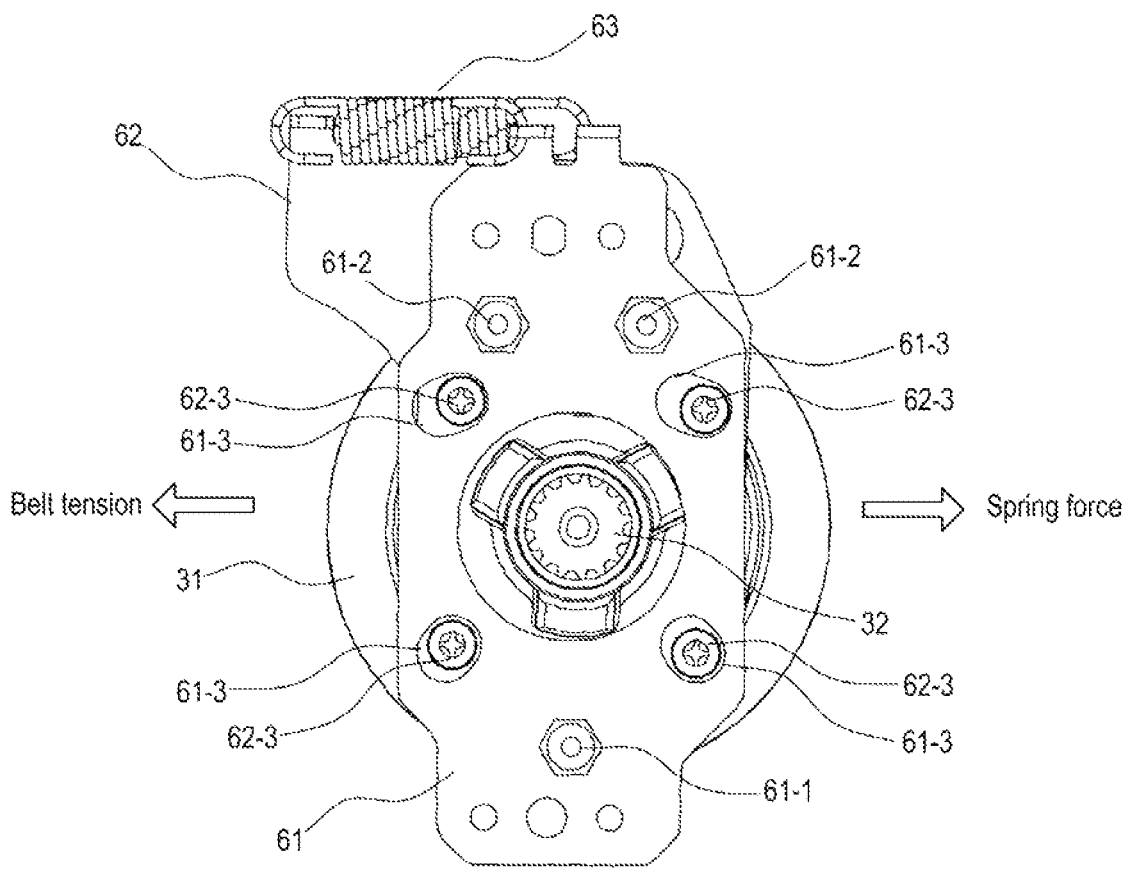
FIG. 10C is a view illustrating a third position to which the gear assembly may move on the gear tensioner

FIGS. 10A to 10C are views illustrating various positions to which the gear assembly 30 may move on the gear tensioner 60.

Among FIGS. 10A to 10C, FIG. 10A illustrates a state in which the second mover 62 moves the most to the left in a movable range (second movable range) because a belt tension is greater than a spring force of the second elastic member 63. In addition, FIG. 10C illustrates a state in which the second mover 62 moves the most to the right in the movable range because the belt tension is smaller than the spring force. In addition, FIG. 10B illustrates a state in which the second mover 62 is positioned at an intermediate point in the movable range because the belt tension and the spring force are balanced.

In this manner, while the force generated by the elastic member 63 mounted between the second base 61 and the second mover 62 and the tension of the first timing belt 20 and the second timing belt 25 are balanced, an appropriate tension may be maintained also in the second timing belt 25. When the tension of the second timing belt 25 increases or decreases for any reason, the gear assembly 30 moves close to or away from the output pulley 41 by the second mover 62. That is, an inter-shaft distance between the rotation shaft Cx of the output pulley 41 and the rotation shaft Bx of the gear assembly 30 is adaptively adjusted, such that the tension of the second timing belt 25 is maintained within an appropriate range.

Figure 11:
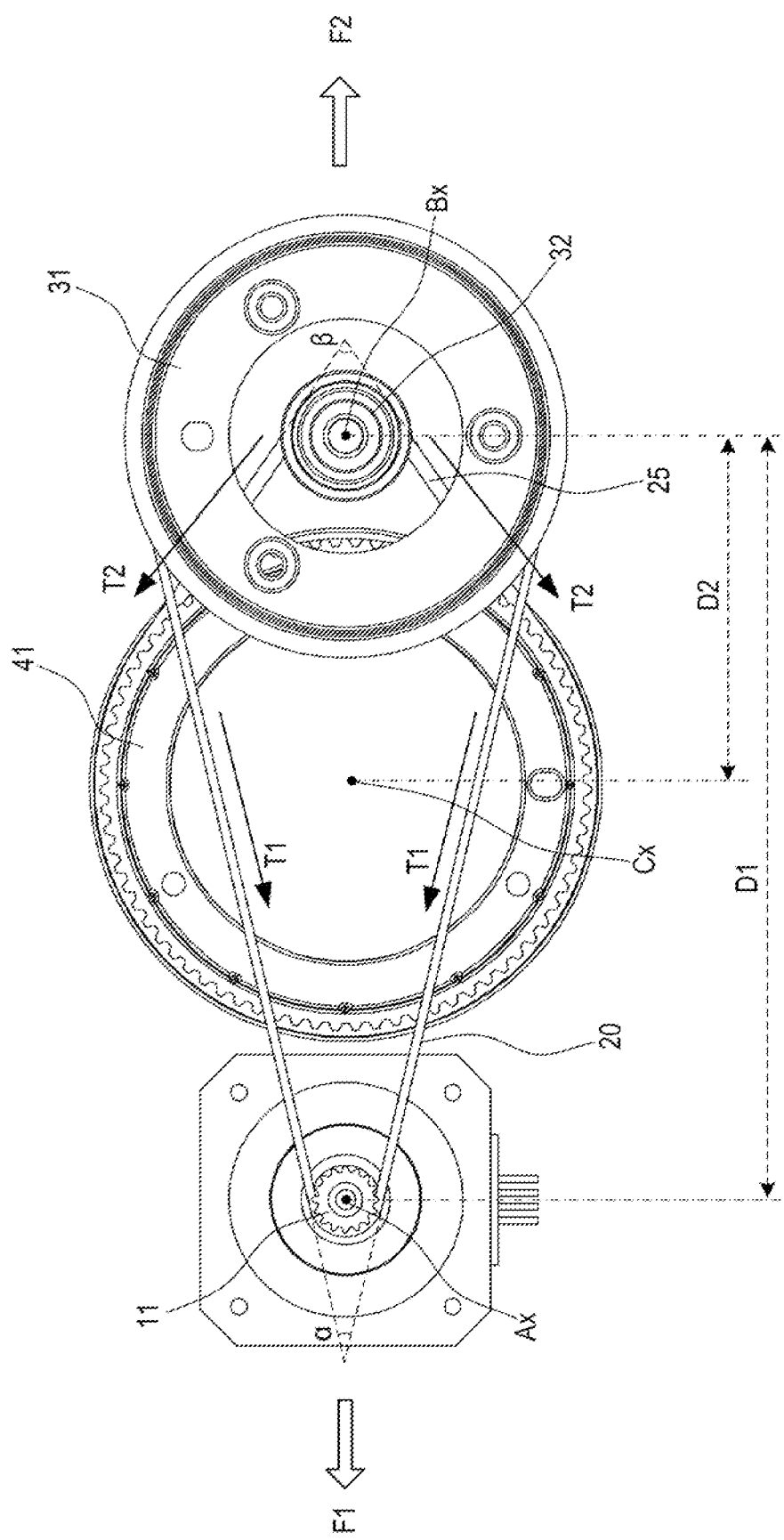
FIG. 11 is a plan view illustrating only pulleys and gears in the camera driving device in order to show a balance between forces generated by timing belts and elastic members.

FIG. 11 is a plan view illustrating only the input pulley 11, the output pulley 41, the first gear 31, and the second gear 32 in the camera driving device 100 in order to show a balance between forces generated by the first timing belt 20 and the second timing belt 25 and the first elastic member 53 and the second elastic member 63.

A fluctuation amount of an inter-shaft distance D2 between the second rotation shaft Bx and the third rotation shaft Cx by the gear tensioner 60 affects an inter-shaft distance D1 between the first rotation shaft Ax and the second rotation shaft Bx by the motor tensioner 50. Accordingly, the fluctuation amount of the inter-shaft distance D2 should be smaller than a fluctuation amount of the inter-shaft distance D1, and thus, movable ranges of the motor tensioner 50 and the gear tensioner 60 may be set to be different from each other so that a difference occurs between the fluctuation amounts of the inter-shaft distance D1 and the inter-shaft distance D2 even though the same elastic member is applied to the motor tensioner 50 and the gear tensioner 60. That is, the movable range (first movable range) of the first mover 52 provided in the motor tensioner 50 may be designed to be greater than the movable range (second movable range) of the second mover 62 provided in the gear tensioner 60.

In addition, a tension T2 acting on the second timing belt 25 is compositely affected by a tension T1 acting on the first timing belt 20 and a spring force of the second elastic member 63. Accordingly, a spring force F2 of the second elastic member 63 of the gear tensioner 60 may be designed to be greater than a spring force F1 of the first elastic member 53 of the motor tensioner 50.

Referring to FIG. 11, relationships as represented by the following Equation 3 and 4 are satisfied between the spring force F1 of the first elastic member 53, the spring force F2 of the second elastic member 63, the tension T1 of the first timing belt 20, and the tension T2 of the second timing belt 25.

$$F1 = 2 \times T1 \times \cos(\alpha/2) \qquad \text{[Equation 3]}$$

$$F2 = F1 + 2 \times T2 \times \cos(\beta/2) = 2 \times \{T1 \times \cos(\alpha/2) + T2 \times \cos(\beta/2)\} \qquad \text{[Equation 4]}$$

Here, $\alpha$ and $\beta$ are an angle formed by the first timing belt 20 and an angle formed by the second timing belt 25, respectively, and T1 and T2 are a tension of the first timing belt 20 and a tension of the second timing belt 25, respectively.

Figure 12:
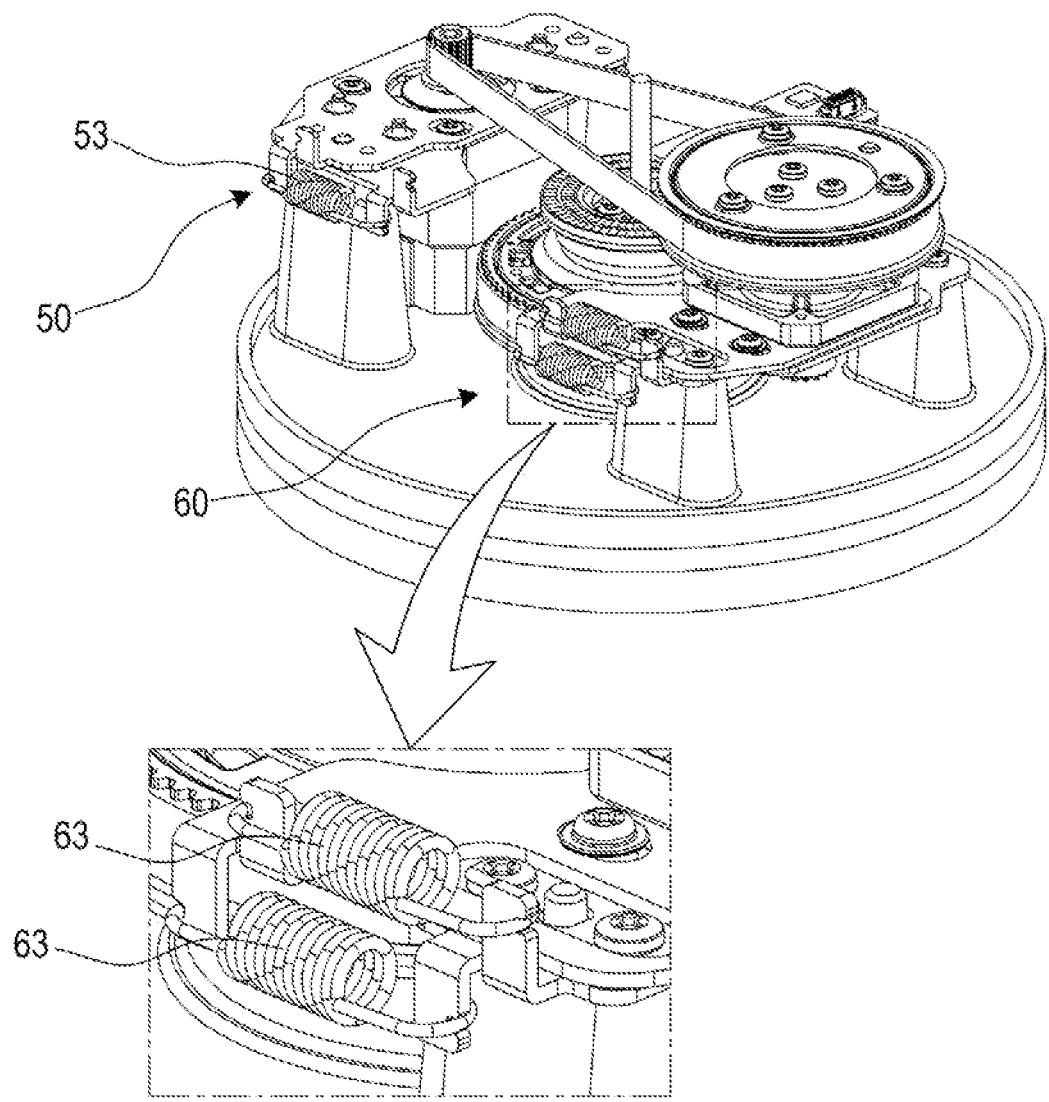
FIG. 12 is a perspective view illustrating an installation form of a first elastic member of the motor tensioner and a second elastic member of the gear tensioner.

FIG. 12 is a perspective view illustrating an installation form of the first elastic member 53 of the motor tensioner 50 and the second elastic member 63 of the gear tensioner 60.

According to Equations 3 and 4 described above, the spring force F1 of the second elastic member 63 may be greater than the spring force F2 of the first elastic member 53. Specifically, the spring force F1 is calculated to be approximately 1.7 times the spring force F2. In consideration of such a situation, according to an example embodiment of the present disclosure, the second elastic member 63 may include two identical coil springs for the gear tensioner 60, and the first elastic member 53 may include a single coil spring that is identical to each of the coils springs of the second elastic member 63 for the motor tensioner 50.

In addition, there are methods such as a method of adjusting the numbers of turns of the coil springs and a method of adjusting outer diameters of the coil springs, but since it is difficult for an operator to identify the coil springs when looking at only appearances of the coil springs, there may be a possibility of erroneous assembling when assembling the camera driving device 100. However, by adjusting only the numbers of employed identical coil springs as in the above example embodiment, there is an advantage that a risk of erroneous assembling may be decreased and it may be easily confirmed with the naked eyes whether or not assembling abnormality occurs.

Hereinafter, an assembling method of assembling the camera driving device 100 described above will be described.

First, the output pulley 41 is installed on the pulley support 45 in the camera housing 70. Thereafter, the gear support 35 rotatably supporting the gear assembly 30 is assembled on the gear tensioner 60. Then, the output pulley 41 and the second gear 32 are coupled to each other by the second timing belt 25. Then, the motor 10 is assembled on the motor tensioner 50. Finally, the input pulley 11 formed in the motor and the first gear 31 are coupled to each other by the first timing belt 20, such that the assembling of the camera driving device 100 is completed. The reason for installing the first timing belt 20 after installing the second timing belt 25 as described above is to decrease an assembling error of the first timing belt 20 and the second timing belt 25 because the tension of the second timing belt 25 affects the first timing belt 20. However, in the camera driving device 100 according to the present disclosure, the inter-shaft distance D1 and the inter-shaft distance D2 (see FIG. 11) are automatically adjusted even after the installation of the first timing belt 20 and the second timing belt 25, and thus, a particular problem may not occur even though the installation order described above is changed.

In the assembling method described above, a process of assembling the gear support 35 on the gear tensioner 60 may be performed more specifically in the order of a step of assembling the second mover 62 and the second base 61 that constitute the gear tensioner 60, a step of mounting the gear support 35 on the second mover 62, and a step of connecting the second mover 62 and the second base 61 to each other by the second elastic member 63.

Similarly, a process of assembling the motor 10 on the motor tensioner 50 may be performed in the order of a step of assembling the first mover 52 and the first base 51 that constitute the motor tensioner 50, a step of mounting the motor 10 on the first mover 52, and a step of connecting the first mover 52 and the first base 51 to each other by the first elastic member 53.

Many modifications and other embodiments of the disclosure will come to the mind of one skilled in the art having the benefit of the teachings presented in the foregoing descriptions and the associated drawings. Therefore, it is understood that the present disclosure is not to be limited to the specific embodiments described above, and that modifications and other embodiments are intended to be included in the disclosure.

What is claimed is:

1. A camera driving device comprising:
a motor configured to generate a driving force;
an input pulley attached to the motor;
a gear assembly including a first gear coupled to the input pulley by a first timing belt, and a second gear formed coaxially with the first gear, the second gear configured to rotate together with the first gear; and
an output pulley configured to rotate together with the second gear by a second timing belt, and mounted with a camera module,
wherein a first reduction is made according to a gear transmission ratio between the input pulley and the first gear, a second reduction is made according to a gear transmission ratio between the second gear and the output pulley, and a rotation shaft of the output pulley is positioned between a rotation shaft of the input pulley and a rotation shaft of the first gear, and
wherein the first timing belt and the second timing belt are disposed in parallel with each other, and the first timing belt is positioned closer than the second timing belt to the camera module.

2. The camera driving device of claim 1, further comprising:
a motor tensioner supporting the rotation shaft of the input pulley by elasticity so that the motor is movable; and
a gear tensioner supporting the rotation shaft of the first gear and a rotation shaft of the second gear by elasticity so that the gear assembly is movable,
wherein a tension of the first timing belt is adjusted by movement of the input pulley and movement of the first gear, and a tension of the second timing belt is adjusted by the movement of the first gear.

3. The camera driving device of claim 2, wherein the motor tensioner comprises a first base fixed to a camera housing and a first mover that is configured to pivot within a first movable range around a first reference shaft on the first base, and the motor is mounted on the first mover, and
the gear tensioner comprises a second base fixed to the camera housing, and a second mover that is configured to pivot within a second movable range around a second reference shaft on the second base, and a gear support rotatably supporting the gear assembly is mounted on the second mover.

4. The camera driving device of claim 3, wherein the first base comprises at least one first slot,
the first mover comprises at least one first movable shaft accommodated in the at least one first slot so as to be configured to pivot within the first movable range around the first reference shaft,
the second base comprises at least one second slot, and
the second mover comprises at least one second movable shaft accommodated in the at least one second slot so as to be configured to pivot within the second movable range around the second reference shaft.

5. The camera driving device of claim 4, wherein the first base is in surface contact with the first mover and the second base is in surface contact with the second mover,
the first base comprises through holes in which at least portions of first fasteners mounting the motor on the first mover are accommodated, in order to avoid interference with the first fasteners, and
the second base comprises through holes in which at least portions of second fasteners mounting the gear support on the second mover are accommodated, in order to avoid interference with the second fasteners.

6. The camera driving device of claim 4, wherein the motor tensioner further comprises a first elastic member connected between one side of the first mover and one side of the first base such as to provide a spring force when the first mover pivots on the first base, and
the gear tensioner further comprises a second elastic member connected between one side of the second mover and one side of the second base such as to provide a spring force when the second mover pivots on the second base.

7. The camera driving device of claim 6, wherein the spring force of the second elastic member is greater than the spring force of the first elastic member.

8. The camera driving device of claim 7, wherein the second elastic member is a plurality of springs and the first elastic member is a single spring, and wherein the first movable range is greater than the second movable range.

9. The camera driving device according to claim 1, wherein the output pulley is rotatably supported by a pulley support provided in a camera housing, and comprises an extension rod extending from the output pulley and coupled to the camera module, and the extension rod penetrates through an inside of the first timing belt.

10. A camera driving device comprising:
a motor configured to generate a driving force;
an input pulley attached to the motor;
a motor tensioner supporting a rotation shaft of the input pulley by elasticity so that the motor is movable;
a gear assembly comprising a first gear coupled to the input pulley by a first timing belt, and a second gear formed coaxially with the first gear, the second gear configured to rotate together with the first gear;
a gear tensioner supporting a rotation shaft of the first gear and a rotation shaft of the second gear by elasticity so that the gear assembly is movable; and
an output pulley configured to rotate together with the second gear by a second timing belt and mounted with a camera module,
wherein a first reduction is made according to a gear transmission ratio between the input pulley and the first gear, a second reduction is made according to a gear transmission ratio between the second gear and the output pulley, a tension of the first timing belt is adjusted by movement of the input pulley and movement of the first gear, and a tension of the second timing belt is adjusted by the movement of the first gear,
wherein the motor tensioner comprises a first base fixed to a camera housing, and a first mover configured to pivot within a first movable range around a first reference shaft on the first base, and the motor is mounted on the first mover,
wherein the gear tensioner comprises a second base fixed to the camera housing, and a second mover configured to pivot within a second movable range around a second reference shaft on the second base, and a gear support rotatably supporting the gear assembly is mounted on the second mover, wherein the first base comprises at least one first slot, the first mover comprises at least one first movable shaft accommodated in the at least one first slot so as to be configured to pivot within the first movable range around the first reference shaft, wherein the second base comprises at least one second slot, and wherein the second mover comprises at least one second movable shaft accommodated in the at least one second slot so as to be configured to pivot within the second movable range around the second reference shaft.

11. The camera driving device of claim 10, wherein the motor tensioner further comprises a first elastic member connected between one side of the first mover and one side of the first base such as to provide a spring force when the first mover pivots on the first base, and the gear tensioner further comprises a second elastic member connected between one side of the second mover and one side of the second base such as to provide a spring force when the second mover pivots on the second base.

12. The camera driving device of claim 11, wherein the spring force of the second elastic member is greater than the spring force of the first elastic member, the second elastic member is a plurality of springs, and the first elastic member is a single spring.

13. The camera driving device according to claim 10, wherein the first movable range is greater than the second movable range.

14. The camera driving device according to claim 10, wherein the output pulley is rotatably supported by a pulley support provided in the camera housing, and comprises an extension rod extending from the output pulley and coupled to the camera module, and the extension rod penetrates through an inside of the first timing belt.

15. The camera driving device according to claim 10, wherein the first timing belt and the second timing belt are disposed in parallel with each other, and the first timing belt is positioned closer than the second timing belt to the camera module.

* * * * *